United States Patent
Warner et al.

(10) Patent No.: US 7,713,642 B2
(45) Date of Patent: May 11, 2010

(54) SYSTEM AND METHOD FOR FUEL CELL OPERATION WITH IN-SITU REFORMER REGENERATION

(75) Inventors: Gregory Lee Warner, Schenectady, NY (US); Kenneth Walter Browall, Saratoga Springs, NY (US); Stephane Renou, Clifton, NY (US)

(73) Assignee: General Electric Company, Niskayuna, NY (US)

( * ) Notice: Subject to any disclaimer, the term of this patent is extended or adjusted under 35 U.S.C. 154(b) by 1258 days.

(21) Appl. No.: 11/241,133

(22) Filed: Sep. 30, 2005

(65) Prior Publication Data
US 2007/0077462 A1 Apr. 5, 2007

(51) Int. Cl.
*H01M 8/04* (2006.01)
*H01M 8/06* (2006.01)

(52) U.S. Cl. .............................. 429/13; 429/17; 429/19
(58) Field of Classification Search .................... 429/13, 429/17, 19, 20
See application file for complete search history.

(56) References Cited

U.S. PATENT DOCUMENTS

| | | | | |
|---|---|---|---|---|
| 3,553,023 | A * | 1/1971 | Doyle | 429/13 |
| 5,518,705 | A * | 5/1996 | Buswell et al. | 429/13 X |
| 6,322,914 | B1 * | 11/2001 | Chow et al. | 429/13 |
| 6,541,141 | B1 * | 4/2003 | Frank et al. | 429/17 |
| 6,576,208 | B1 | 6/2003 | Itoh et al. | |
| 6,666,961 | B1 | 12/2003 | Skoczylas et al. | |
| 6,667,022 | B2 | 12/2003 | Cole | |
| 6,669,917 | B2 | 12/2003 | Lyon | |
| 6,677,068 | B2 | 1/2004 | Itoh et al. | |
| 6,716,548 | B1 | 4/2004 | Kaliaguine et al. | |
| 6,730,363 | B1 | 5/2004 | Shah et al. | |
| 6,770,394 | B2 | 8/2004 | Appleby et al. | |
| 6,787,264 | B2 | 9/2004 | Browall et al. | |
| 6,797,420 | B2 | 9/2004 | Ukai et al. | |
| 6,818,134 | B2 | 11/2004 | Lemmon et al. | |
| 6,824,874 | B1 | 11/2004 | Shah et al. | |
| 6,828,054 | B2 | 12/2004 | Appleby et al. | |
| 6,835,478 | B2 | 12/2004 | Hu et al. | |
| 6,838,204 | B1 | 1/2005 | Brudnicki | |
| 6,844,100 | B2 | 1/2005 | Bourgeois et al. | |
| 6,849,353 | B2 | 2/2005 | Vora et al. | |
| 6,855,450 | B2 | 2/2005 | Molter et al. | |
| 6,878,362 | B2 | 4/2005 | Kumar et al. | |
| 6,946,215 | B2 | 9/2005 | Roy et al. | |
| 7,405,012 | B2 * | 7/2008 | Mardilovich et al. | 429/13 |

* cited by examiner

*Primary Examiner*—Stephen J. Kalafut
(74) *Attorney, Agent, or Firm*—Francis T. Coppa

(57) ABSTRACT

A system and method for operating a fuel cell, including reacting a fuel with an oxidant within the fuel cell to produce electricity and reaction products comprising steam. The fuel is fed through the fuel cell, wherein a concentration of the steam increases in the first direction through the fuel cell. The direction of fuel-flow through the fuel cell is altered or reversed upon satisfying a condition, thereby altering the concentration gradient of steam in the fuel cell and providing for removal of carbon deposition with the fuel cell. Such reversal of fuel flow may also provide an exhaust from the fuel cell that can regenerate an external or adjacent hydrocarbon reformer.

21 Claims, 11 Drawing Sheets

SYSTEM AND METHOD FOR FUEL CELL OPERATION WITH IN-SITU REFORMER REGENERATION

BACKGROUND

The invention relates generally to fuel cells and more particularly to promoting fuel reforming, reducing carbon deposition in fuel cells, and increasing the operability time of fuel cells.

Fuel cells are electrochemical energy conversion devices that have demonstrated a potential for relatively high efficiency and low pollution in power generation. A fuel cell generally provides a direct current (dc) which may be converted to alternating current (ac) via an inverter, for example. The dc or ac voltage can be used to power motors, lights, and any number of electrical devices and systems. Fuel cells may operate in stationary, semi-stationary, or portable applications. Certain fuel cells, such as solid oxide fuel cells (SOFCs), may operate in large-scale power systems that provide electricity to satisfy industrial and municipal needs. Others may be useful for smaller portable applications such as powering cars, for example A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents. Therefore, interconnect structures may be used to connect or couple adjacent fuel cells in series or parallel.

In general, components of a fuel cell include the electrolyte and two electrodes. The reactions that produce electricity generally take place at the electrodes where catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) of carbon-based feedstocks, such as reforming of the more readily available natural gas and other hydrocarbon fuels and feedstocks. Examples of hydrocarbon fuels include natural gas, methane, ethane, propane, methanol, syngas, and other hydrocarbons. The reforming of hydrocarbon fuel to produce hydrogen to feed the electrochemical reaction may be incorporated with the operation of the fuel cell. Moreover, such reforming may occur internal and/or external to the fuel cell. For reforming of hydrocarbons performed external to the fuel cell, the associated external reformer may be positioned remote from or adjacent to the fuel cell.

Fuel cell systems that can reform hydrocarbon internal and/or adjacent to the fuel cell may offer advantages, such as simplicity in design and operation. For example, the steam reforming reaction of hydrocarbons is typically endothermic, and therefore, internal reforming within the fuel cell or external reforming in an adjacent reformer may utilize the heat generated by the typically exothermic electrochemical reactions of the fuel cell. Furthermore, catalysts active in the electrochemical reaction of hydrogen and oxygen within the fuel cell to produce electricity may also facilitate internal reforming of hydrocarbon fuels. In SOFCs, for example, if nickel catalyst is disposed at an electrode (e.g., anode) to sustain the electrochemical reaction, the active nickel catalyst may also reform hydrocarbon fuel into hydrogen and carbon monoxide (CO). Moreover, both hydrogen and CO may be produced when reforming hydrocarbon feedstock. Thus, fuel cells, such as SOFCs, that can utilize CO as fuel (in addition to hydrogen) are generally more attractive candidates for utilizing reformed hydrocarbon and for internal and/or adjacent reforming of hydrocarbon fuel.

In general, high operating temperatures within the fuel cell and the presence of the byproduct steam generally promote internal or adjacent reforming of hydrocarbon. Advantageously, excess steam in the fuel cell may reduce the deposition of elemental carbon within the fuel cell and in adjacent reformers. On the whole, internal and/or adjacent reforming and their integration with the fuel cell operation may improve the efficiency and/or economics of the fuel cell operations.

Unfortunately, it is generally difficult to maintain a sufficiently high steam-to-carbon ratio in all regions of a fuel cell to prevent the formation of elemental carbon and the associated carbon deposition, especially if internal reforming is intended to occur on an electrode (e.g., anode) along with the electrochemical reactions, for example. The fuel cell region near the inlet is especially vulnerable to carbon formation. That is, the entering fuel to be internally steam reformed is starved for steam or liquid water ($H_2O$) due to the typical gradient of increasing $H_2O$ (e.g., steam) concentration from the inlet to the outlet of the fuel cell. The $H_2O$ concentration generally increases in the direction of fuel flow toward the exit, and therefore, excess $H_2O$ is generally present at the exit region of the fuel cell. Carbon is generally expected to form near the cell inlet because the $H_2O$ concentration is lowest at the inlet. Carbon deposition in the fuel cell can lead to poor heat/mass transfer, damage, and/or failure of the fuel cells.

Sustaining long term operation of fuel cells may be problematic due to accumulation of carbon deposits within the fuel cell. Such carbon deposits are typically relatively worse if fuel cells rely on carbon-based feedstocks instead of cleaner hydrogen-based feedstocks. Eventually, the fuel cell may need to be shut down or replaced, interrupting production of electricity and increasing maintenance costs of the fuel cell system, for example. Further, reformers or pre-reformers used for external reforming and/or adjacent reforming may also be subjected to significant carbon deposition. Therefore, these reformers are also generally shut down for regeneration (e.g., via steam), increasing operating and maintenance costs, and reducing the efficiency of the overall fuel cell system.

Therefore, there is a need for advancing the efficiency and simplicity of internal and external reforming of hydrocarbon fuels to feed the electrochemical reactions in fuel cells while reducing the need to shutdown the fuel cell and/or associated reformers due to regeneration and removal of carbon deposition. There is a particular need to reduce and/or mitigate carbon deposition in fuel cells and associated reformers.

BRIEF DESCRIPTION

In one embodiment of the present invention, a method of operating a fuel cell is provided. The method includes reacting a fuel with an oxidant within the fuel cell to produce electricity and reaction products comprising steam, wherein a concentration of the steam increases in a direction of a flow of the fuel through the fuel cell. Further, this embodiment provides for flowing the fuel in a first direction through the fuel cell, wherein a concentration of the steam increases in the first direction through the fuel cell, and altering the flow of fuel from the first direction to a second (e.g., opposite) direction through the fuel upon satisfying a predetermined condition, wherein altering the direction of fuel flow alters the concentration of steam within the fuel cell to generally increasing in the second direction.

In another embodiment the present technique provides for flowing fuel through the fuel cell, and reacting the fuel with an oxidant within the fuel cell to produce electricity and reaction products comprising steam, wherein a concentration of steam within the fuel cell generally increases in a direction of the fuel flow through the fuel cell. The direction of fuel flow through the fuel cell is altered (e.g., reversed) upon satisfying a predetermined condition and without substantially interrupting the production of electricity by the fuel cell, wherein altering the direction of fuel flow alters a concentration gradient of the steam within the fuel cell.

In yet another embodiment, hydrocarbon fuel is fed through a first reformer to the fuel cell, where the hydrocarbon fuel is reformed in the first reformer and reformed hydrocarbon fuel is reacted with an oxidant in the fuel cell to generate electricity. Exhaust from the fuel cell is discharged through a second reformer to regenerate the second reformer with the exhaust, wherein the exhaust comprises steam.

Other embodiments incorporate an arrangement of fuel cells, a first reformer configured to reform feed to a first inlet of the arrangement of fuel cells and, alternatively, to receive an exhaust from a first outlet of the arrangement of fuel cells. A second reformer is configured to reform hydrocarbon feed to a second inlet of the arrangement of fuel cells and, alternatively, to receive an exhaust from a second outlet of the arrangement of fuel cells.

Additional embodiments include a fuel cell, a first reformer operatively coupled to a first inlet of the fuel cell and to a first outlet of the fuel cell, and a second reformer operatively coupled to a second inlet of the fuel cell and to a second outlet of the fuel cell, wherein the first and second reformers are configured to catalytically react a carbon-based fuel into at least hydrogen.

DRAWINGS

These and other features, aspects, and advantages of the present invention will become better understood when the following detailed description is read with reference to the accompanying drawings in which like characters represent like parts throughout the drawings, wherein.

Figure 11:
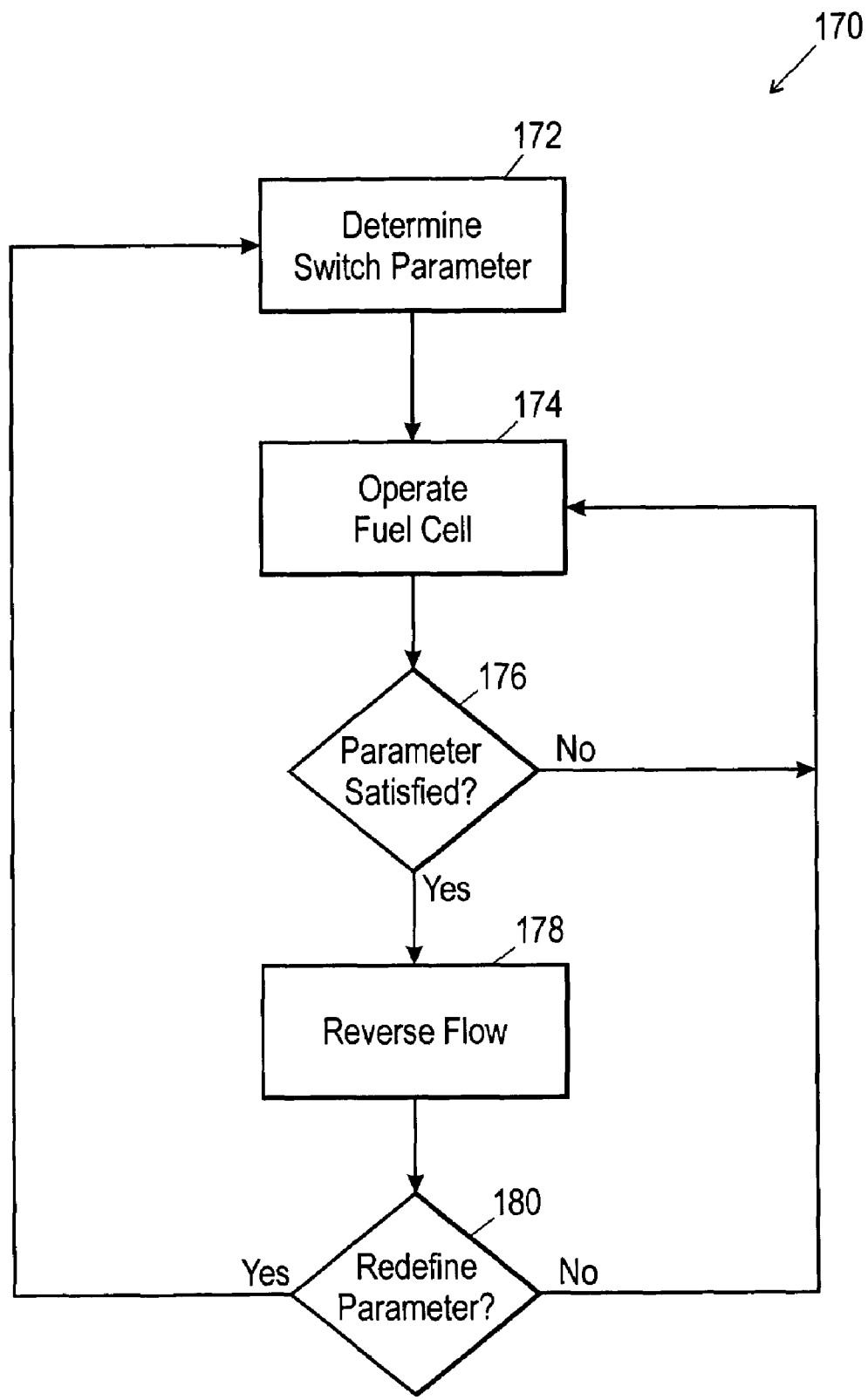
Figure 12:
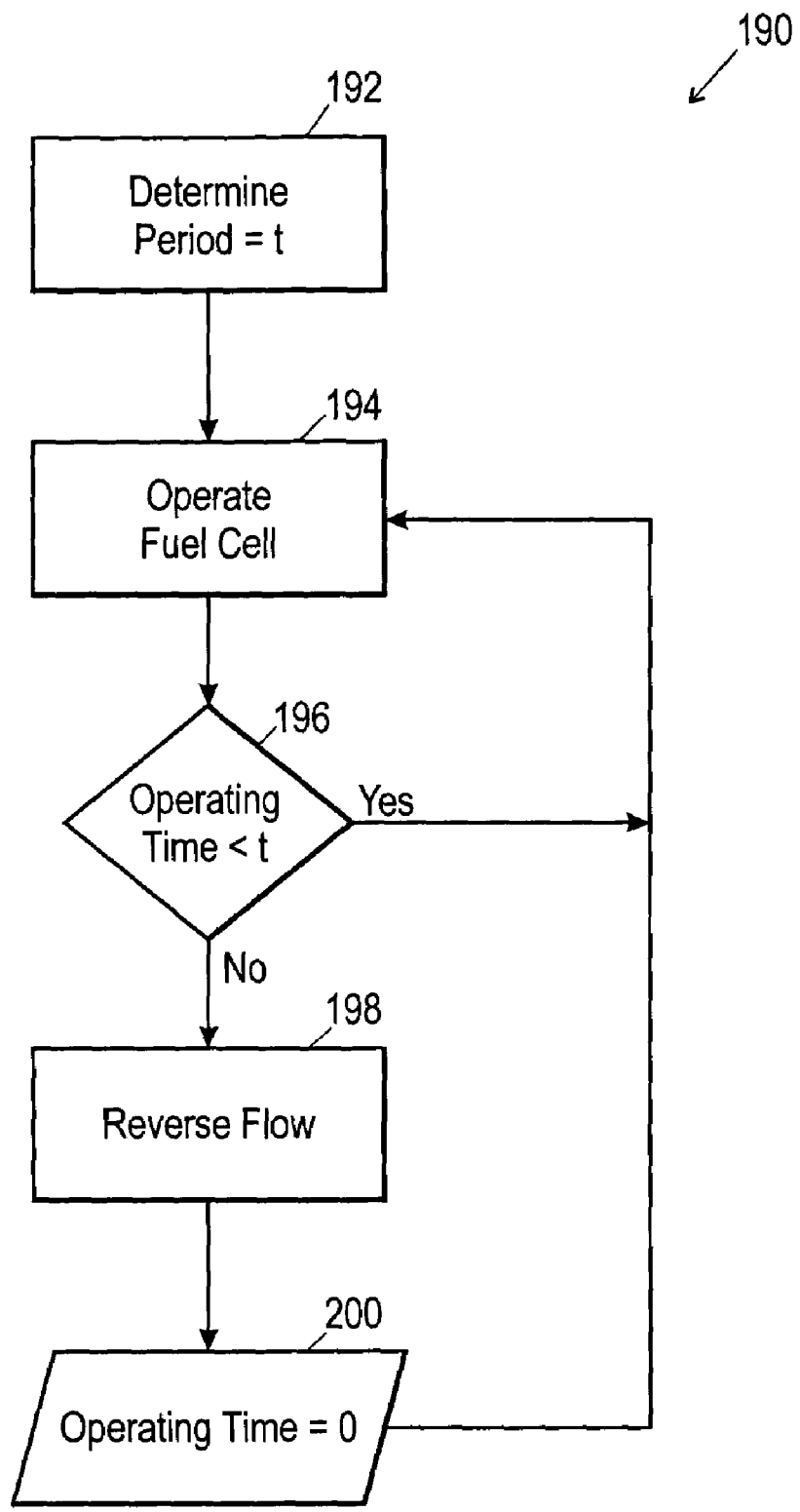

FIG. 11 is a block diagram of an exemplary method for reversing fuel flow through a fuel cell and/or assembly of fuel cells in accordance with embodiments of the present technique; and FIG. 12 is a block diagram for an exemplary method for reversing fuel flow through a fuel cell and/or assembly of fuel cells based on reaching a predetermined amount of time in accordance with embodiments of the present technique.

DETAILED DESCRIPTION

Figure 1:
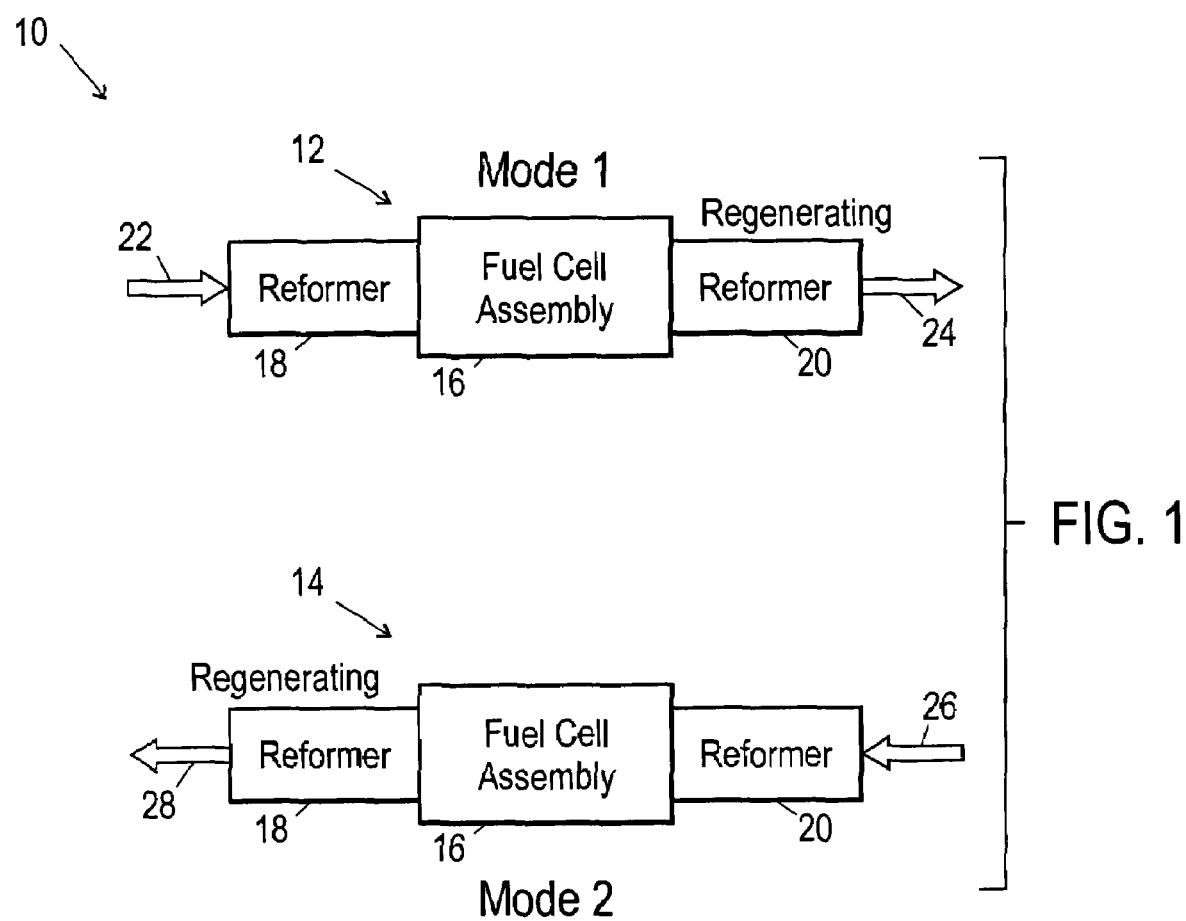
FIG. 1 is a diagrammatical representation of a fuel cell system and depicting two operating modes of the fuel cell system in accordance with embodiments of the present technique.

FIG. 1 depicts a fuel cell system 10 having two operating modes, as indicated by reference numerals 12 and 14, respectively. As illustrated, the fuel cell system 10 includes an assembly 16 of fuel cells, a first reformer 18, and a second reformer 20. Further, multiple fuel cells are assembled in series or parallel in the exemplary assembly 16 to produce power at useful currents and voltages. Interconnecting members may electrically couple adjacent fuel cells to form the fuel cell assembly 16. The assembly 16 and individual fuel cells may have planar configurations (e.g., planar stacks), tubular configurations (e.g., tube bundles), and so on. The electrical current generated by the assembly 16 typically returns to the assembly 16 of fuel cells, completing an electrical circuit and returning electrons to accommodate the electrochemical cycle within the fuel cells. Moreover, while the inlet/outlet of the fuel cell system 10 is represented as end-to-end, alternate configurations may be employed. Further, while the reformers 18 and 20 are depicted adjacent to the assembly 16 of fuel cells, the reformers 18 and 20 may alternatively be disposed remote from the assembly 16.

The individual fuel cells within fuel cell assembly 16 each include two electrodes and an electrolyte. In operation, the fuel cells produce electricity by catalyzing fuel (e.g., hydrogen) and oxidant (e.g., air or oxygen) into ionized atomic hydrogen at one electrode (e.g., anode) and into ionized atomic oxygen at another electrode (e.g., cathode). Hydrogen or carbon monoxide (CO) in the fuel stream reacts with oxide ions ($O^{2-}$) from the electrolyte to produce water (i.e., steam or liquid water) or carbon dioxide ($CO_2$) and to deposit electrons into the anode. The electrons pass outside the assembly 16 of fuel cells, through one or more electrical loads, and back to the cathode where oxygen (e.g., from air) receives the electrons and is converted into oxide ions which are injected into the electrolyte.

In the case of solid oxide fuel cells (SOFCs), the electrolyte includes a solid oxide, such as a ceramic. However, to achieve adequate ionic conductivity in a ceramic electrolyte, the fuel cell system may operate at high temperatures, such as between approximately 600° C. and 1100° C. At these temperatures, internal reforming of carbonaceous fuels is generally possible. In addition, waste heat from such a device can be utilized by conventional thermal electricity generating plants to increase fuel efficiency.

The exemplary reformers 18 and 20 typically include reforming catalyst to assist in the reforming reaction. Steam (not shown) is commonly supplied to the reformers 18 and 20 to convert hydrocarbon fuel into hydrogen and carbon monoxide to feed the electrochemical reaction within the fuel cells in the assembly 16. As indicated, steam reforming is typically endothermic and, therefore, internal reforming (i.e., reforming inside the fuel cell) or adjacent reforming (i.e., via a reformer positioned adjacent to the fuel cells) may be integrated with the fuel cell operation to facilitate control of high operating temperatures and of the exothermic electrochemical reactions within the fuel cells. In certain types of fuel cells, hydrocarbon fuels may be fed directly and reformed internally within the fuel cell to produce hydrogen (and CO) as fuel for the electrochemical reaction. While fuel cells that can reform hydrocarbon internal and/or adjacent to the fuel cell may offer advantages, internal reforming inside the fuel cell (e.g., at the electrochemical catalyst and other locations) generally results in carbon deposition within the fuel cell. In certain embodiments, carbon deposition may still occur in the fuel cell even if the hydrocarbon fuels are reformed (or partially-reformed) prior to entry to the fuel cell because residual reforming may still occur inside the fuel cells in the assembly 16.

As discussed, the inlet region of the fuel cells within the assembly 16 are prone to carbon deposition due to the relatively lower concentration of $H_2O$ (steam or liquid water) at the inlet. The electrochemical reaction within the fuel cell generates $H_2O$, and the result is a gradient of increasing $H_2O$ concentration from the inlet to the outlet of the fuel cells. The $H_2O$ concentration increases in the direction of fuel flow toward the exit of the fuel cells within the assembly 16. Therefore, again, the reforming reaction near the inlet generally is deficient in $H_2O$. Accordingly, the reversal of fuel flow, as depicted in changing from mode 1 to mode 2 in FIG. 1, reverses the $H_2O$ concentration gradient to beneficially remove (e.g., via hydrothermal combustion) carbon deposition formed at the former inlet region of the previous mode.

The two operating modes 1 and 2 provide for different directions of fuel flow (e.g., reversed) through the fuel cell system 10. Again, upon reversal of the flow of fuel through a fuel cell within the assembly 16, the concentration gradient of the byproduct steam through the fuel cells within the assembly 16 is altered or reversed, thereby modulating the gradient of the steam-to-carbon ratio through the fuel cell to lessen and remove carbon deposition in the fuel cell. In operating mode 1, the fuel cell system 10 has a fuel inlet 22 (e.g., hydrocarbon fuel) and an exhaust outlet 24 (e.g., steam enriched).

In mode 1, the first reformer 18 performs the reforming reaction, converting hydrocarbon fuel into at least hydrogen and carbon monoxide. If applicable, the first reformer 18 may act as a guard reactor to reduce the amount of reforming of hydrocarbon that occurs internal within the assembly 16, and therefore, reduces the amount of carbon deposition within the assembly 16 and its fuel cells. It should be noted, however, that the assembly 16 may be configured for internal reforming to complement the reforming of hydrocarbons performed in external or adjacent reformers, such as the first reformer 18. Indeed, the system 10 may be configured such that a certain amount of reforming occurs in the reformer 18 and the balance of reforming occurs within the fuel cells themselves. In various embodiments, the weight percent of the hydrocarbon fuel entering the system 10 that is reformed within the fuel cells can be any percentage ranging from about 0% to about 100% (e.g., about 5%, 10%, 20%, 30%, 40%, 50%, 60%, 70%, 80%, 90%, and/or 95%), about 5% to about 95%, about 10% to about 90%, about 20% to about 80%, about 30% to about 70%, about 40% to about 60%, and/or any intermediate ranges and values within the given exemplary ranges, and so forth. Such weight percents may be adjusted operationally, for example.

In mode 1, the second reformer 20 generally does not reform hydrocarbon for feed to the fuel cell assembly 16. Instead, the second reformer 20 in mode 1 is regenerated by the exhaust 24 of the assembly 16. In other words, the second reformer 20 is configured as an exit reformer in mode 1 and is under regeneration to revive the reforming catalyst in the reformer 20. Both the heat and $H_2O$ in the exhaust stream 24 exiting the fuel cell assembly 16 facilitates the regeneration (e.g., via hydrothermal combustion) of the second reformer 20 and the removal of carbon deposition. Such regeneration of the second reformer 20 via the exhaust 24 of the assembly 16 facilitates substantially continuous operation of the fuel cell system 10.

In operating mode 2, the direction of the fuel flow is reversed through the fuel cell system 10. Such a reversal of fuel flow may be implemented on-line without substantial interruption to the operation of the fuel cell system 10. The direction of the typically excess oxidant (not shown) fed to the assembly 16 may be maintained in the same direction or reversed with the fuel, depending on the configuration of the fuel cell system 10 and other factors such as mitigating thermal stresses, and so on. In mode 2, fuel 26 enters and exhaust 28 exits at opposite ends or sides of the fuel cell system 10 relative to operating mode 1. Therefore, the second reformer 20 in mode 2 is configured as the inlet reformer for reforming hydrocarbon (e.g., natural gas) into hydrogen and carbon monoxide, and may also act as a guard reactor of the assembly 16 if desired. The first reformer 18 in mode 2 is configured as the exit reformer and is regenerated by the exhaust 28. The heat and steam exiting the fuel cell assembly 16 in the exhaust 28 regenerates the catalyst in first reformer 18 and removes carbon deposition within the reformer 18. Further, as discussed, the reversal of fuel flow substantially reverses the gradient of steam concentration within the fuel cells within assembly 16, thereby facilitating hydrothermal combustion of carbon deposition at the preceding inlet (in mode 1) of the fuel cells.

Figure 2:
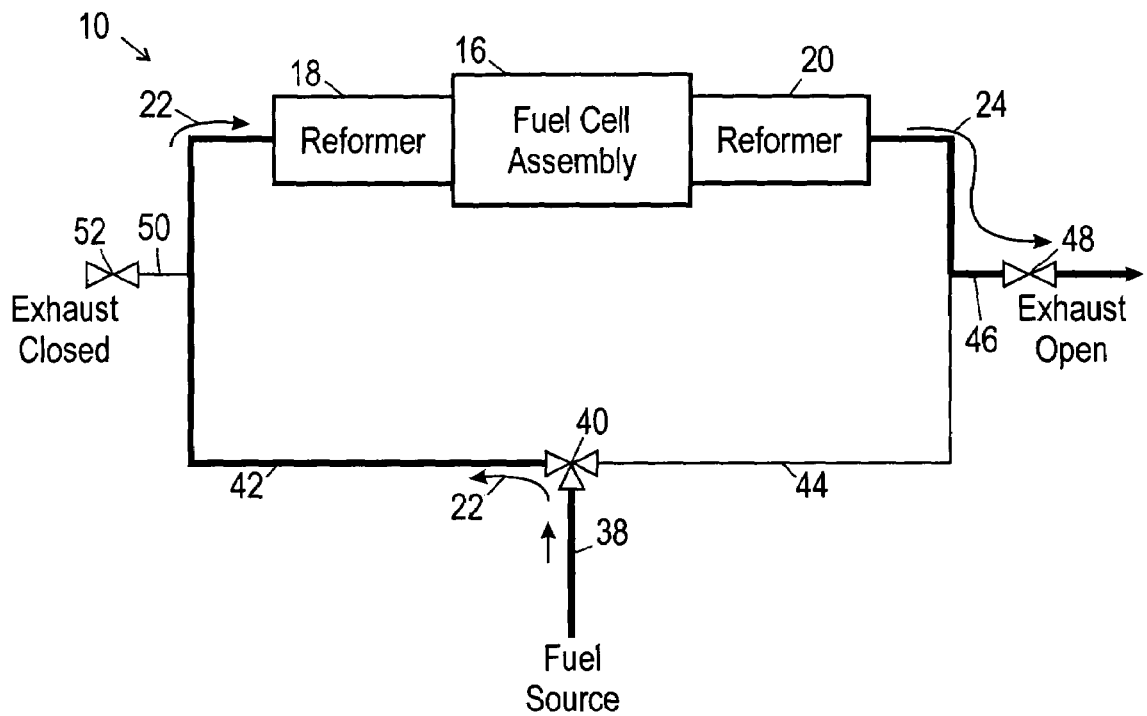
FIG. 2 is a flow diagram of the fuel cell system of FIG. 1 operating in a first mode in accordance with embodiments of the present technique.
Figure 3:
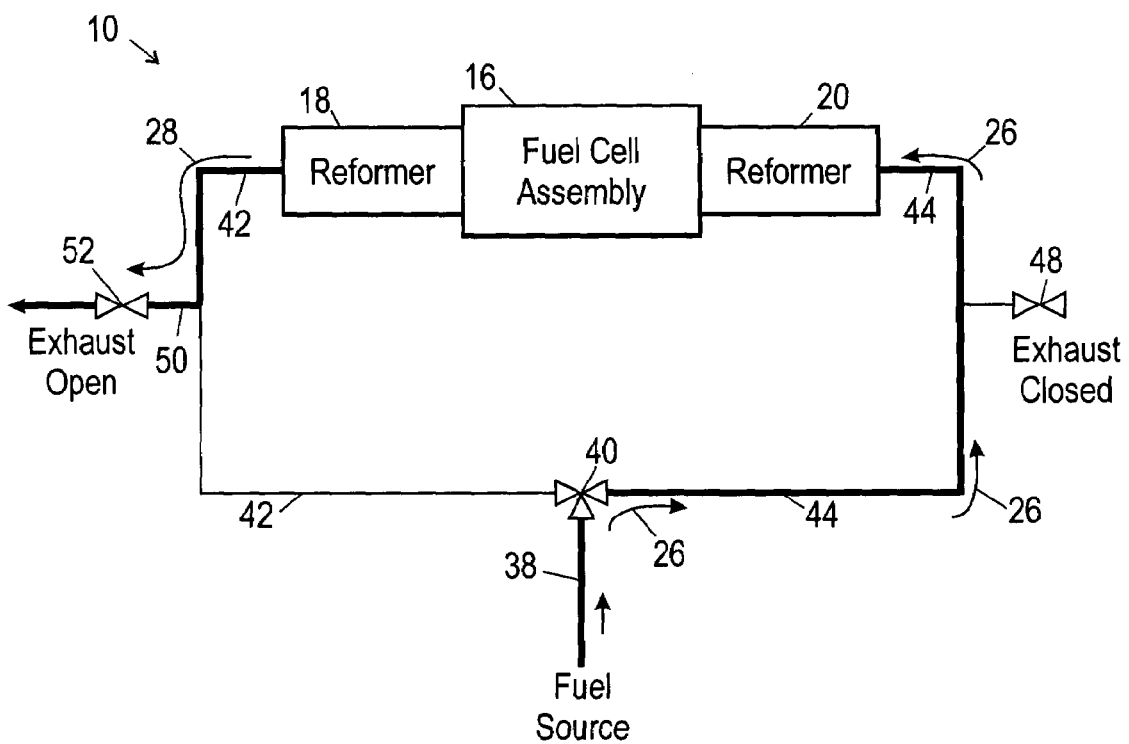
FIG. 3 is a flow diagram of the fuel cell system of FIG. 1 operating in a second mode having a substantially reversed direction of fuel flow relative to the first mode in accordance with embodiments of the present technique.

FIGS. 2 and 3 depict the exemplary fuel system 10 operating in modes 1 and 2, respectively. A fuel supply conduit 38 delivers fuel such as natural gas and hydrogen from a fuel source through a three-way valve 40 either through conduit 42 in mode 1 or through conduit 44 in mode 2. When operating in mode 1 as depicted in FIG. 2, the fuel enters the reformer 18 through conduit 42 as depicted by arrow 22. The exhaust exits the second reformer 20 through a portion of conduit 44 and through conduit 46 and exhaust valve 48, as depicted by arrow 24. When operating in mode 2 as depicted in FIG. 3, the fuel enters from the fuel source through conduit 38 and through a three-way valve 40. The fuel enters the reformer 20 through a conduit 44, as indicated by arrow 26.

The exhaust exits reformer 18 through a portion of the conduit 42 and through a conduit 50 and exhaust valve 52, as indicated by arrow 28. It should be emphasized that a variety of piping and valving configurations including various types of valves may be employed to accommodate the reversal of flows for the fuel supply and exhaust. In the illustrated embodiment, a three-way valve is employed for directing the fuel supply. However, other arrangements, such as a double-valve or multi-valve arrangement, a four-way valve, and so on may be employed. Likewise, the exhaust valves may employ such arrangements.

Typically, reforming a hydrocarbon fuel, such as natural gas, with steam, in the first and second reformers 18 and 20 produces hydrogen and carbon monoxide, both of which can be used as fuel in the electrochemical reactions in a solid oxide fuel cell (SOFC), for example. This process is generally energy intensive (i.e., the steam reforming reaction is endothermic) and significant heat may be absorbed in the overall reforming process. In the example of natural gas, the main constituent is methane ($CH_4$), which reacts with steam to produce hydrogen and carbon monoxide (see equation (1) below). Further, through the reforming process may also incorporate a second reaction (see equation (2) below), sometimes called a gas shift reaction, where the carbon monoxide is converted to carbon dioxide and hydrogen.

$$CH_4 + H_2O \Rightarrow CO + 3H_2 \quad (1)$$

$$CO + H_2O \Rightarrow CO_2 + H_2 \quad (2)$$

Figure 4:
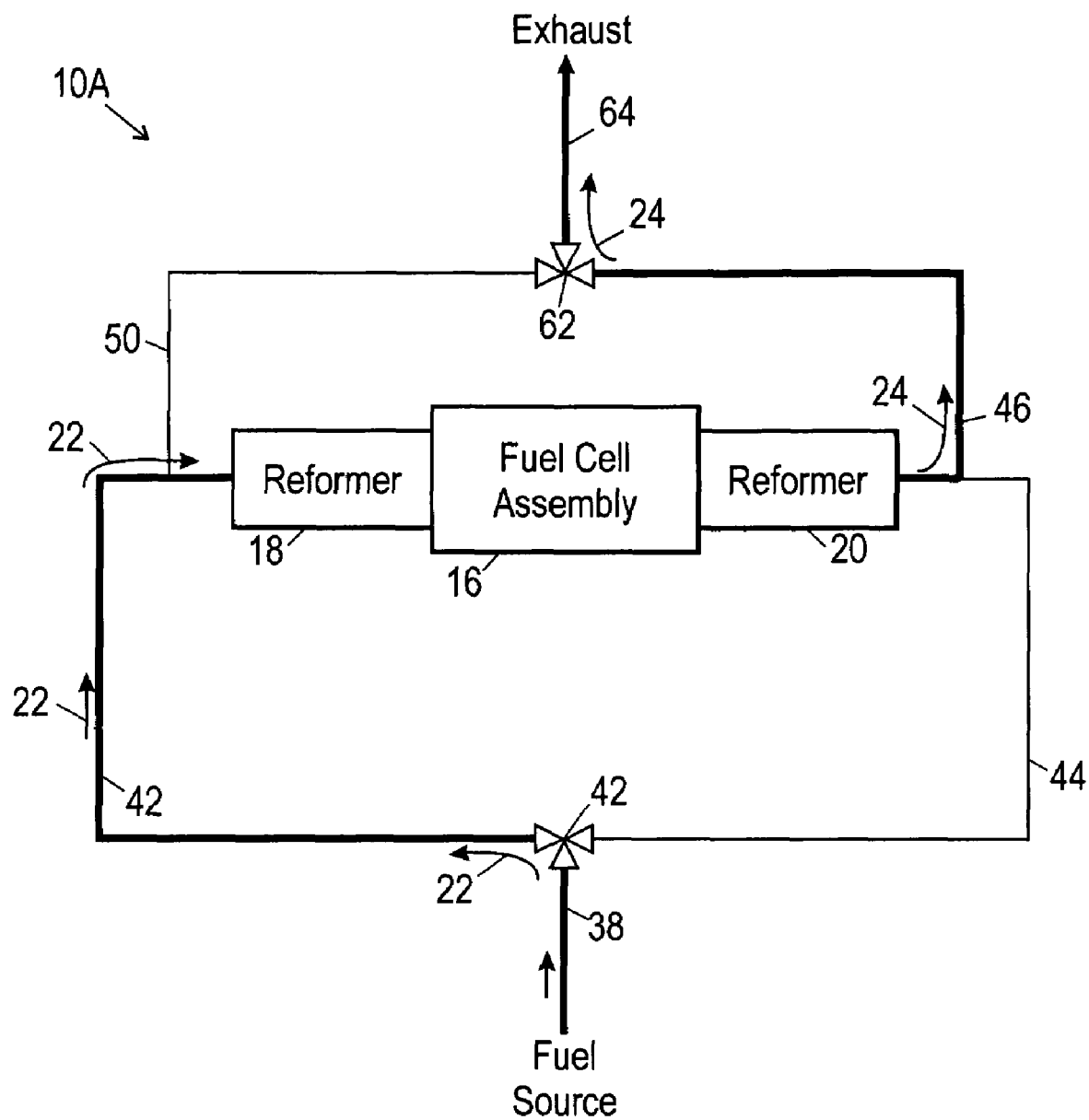
FIGS. 4 and 5 are flow diagrams of the fuel cell system of FIGS. 2 and 3, respectively, having an alternate exhaust configuration in accordance with embodiments of the present technique.
Figure 5:
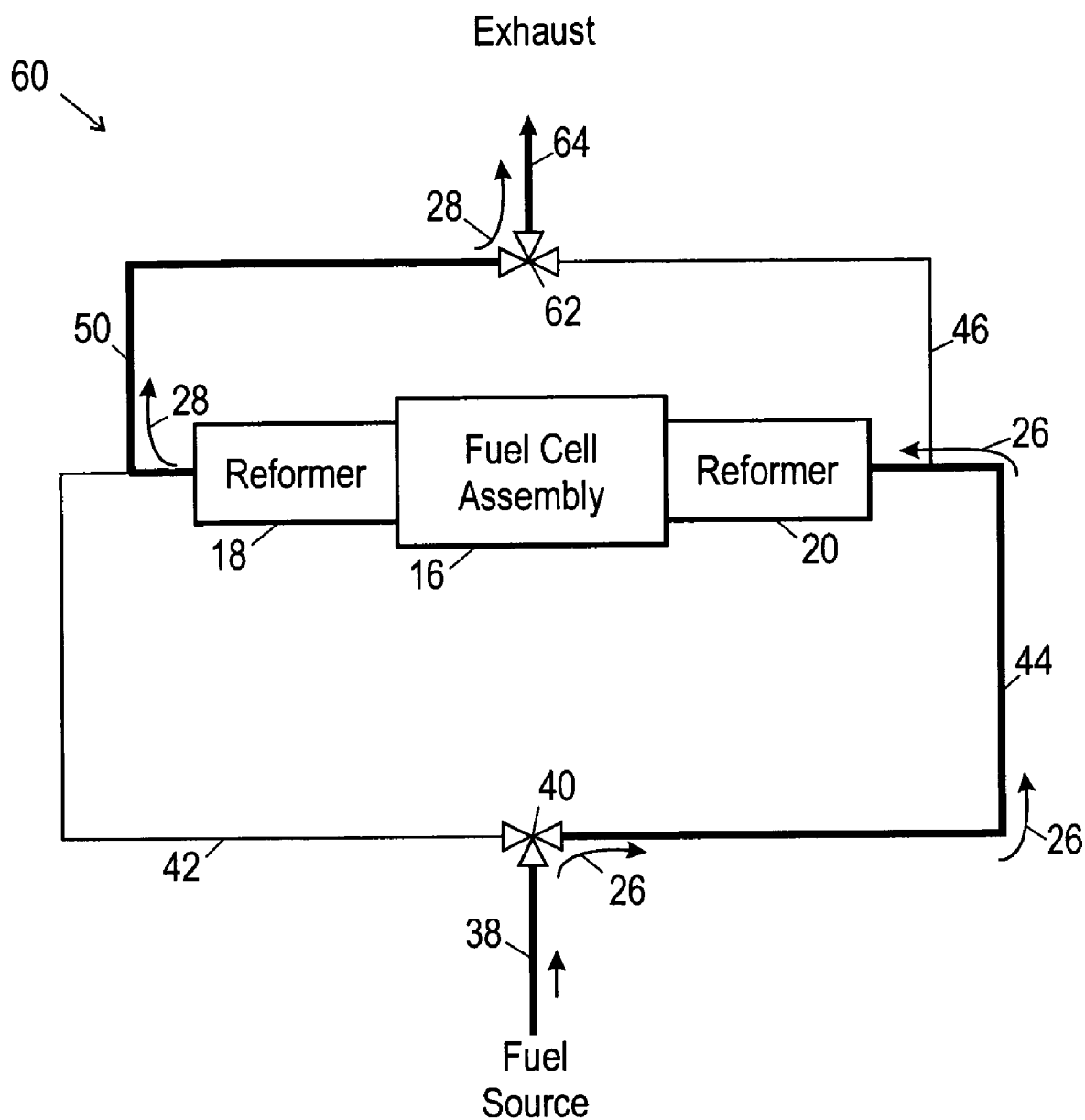

FIGS. 4 and 5 illustrate a fuel cell system 10A and 60 respectively, having an alternate configuration of exhaust piping. FIGS. 4 and 5 and depict the exemplary fuel cell system 10A and 60 respectively, operating in modes 1 and 2, respectively. A three-way valve 62 is employed to receive exhaust 24 and 26 from either conduit 46 or conduit 50, respectively, depending on the operating mode. Therefore, in the illustrated embodiment, the single three-way valve 62 is utilized in lieu of the two exhaust valves 48 and 52 depicted in FIGS. 2 and 3. In operating mode 1 in FIG. 4, the flow of exhaust is generally indicated by arrows 24 (see also FIG. 1). The exhaust 24 exits through the second reformer 20 and travels through exhaust conduit 46 to the three-way valve 62. The exhaust 24 exits the three-way valve 62 discharging into the common exhaust conduit 64. In contrast, when operating in mode 2 as depicted in FIG. 5, the flow of exhaust is generally indicated by arrow 28 (see also FIG. 1). In mode 2, the exhaust 28 exits the reformer 18 and travels through exhaust conduit 50 to the three-way valve 62. The exhaust 28 exits the three-way valve 62 flowing into the common exhaust conduit 64. Again, it should be note that that a variety of piping and valving configurations may be employed to handle the exhaust exiting the fuel cell assembly 16 and reformers 18 and 20 in the different operating modes.

Figure 6:
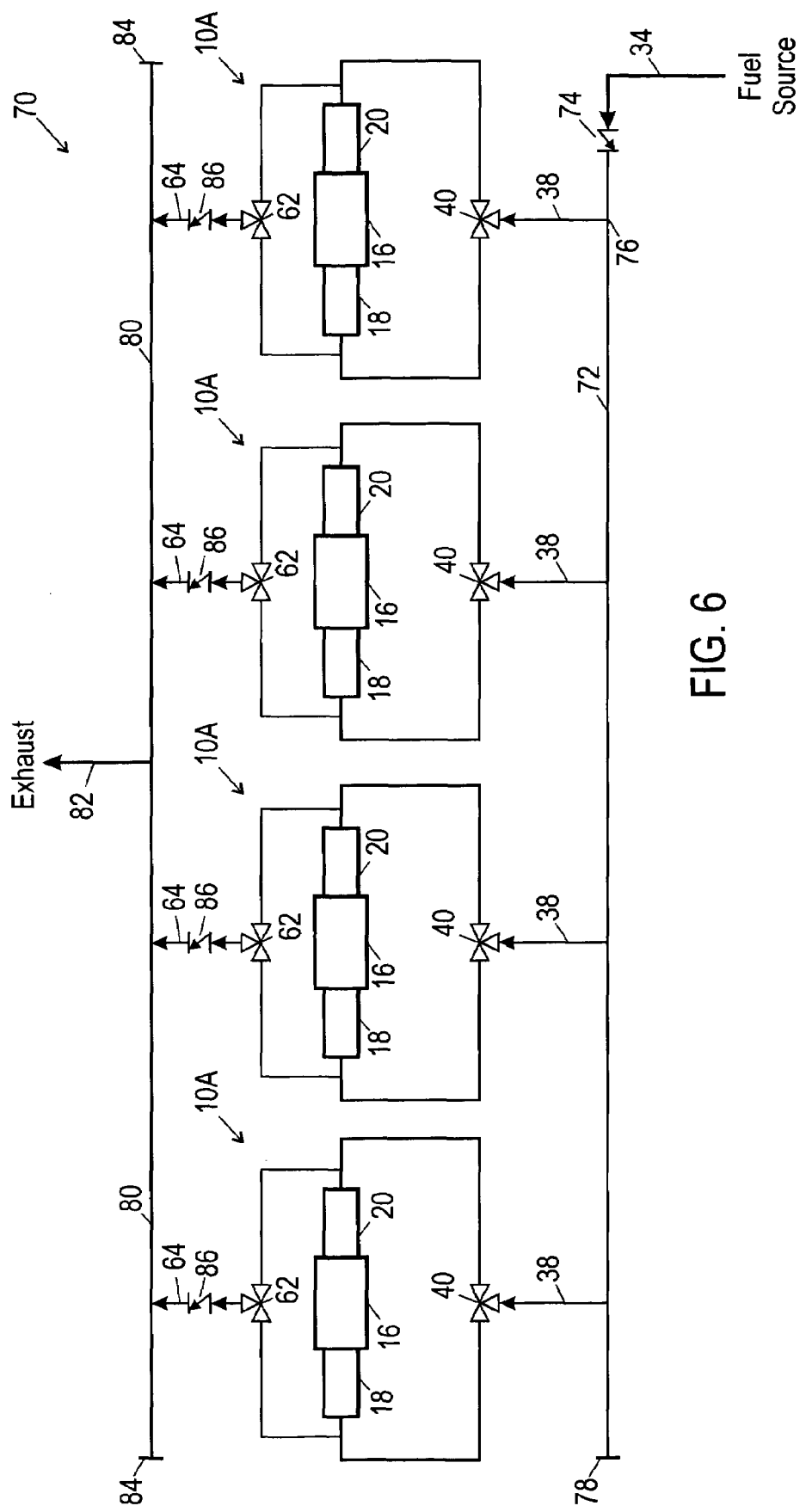
FIG. 6 is a flow diagram of multiple fuel cell systems having a common fuel-supply manifold and a common exhaust manifold in accordance with embodiments of the present technique.

FIG. 6 depicts an exemplary power system 70 having multiple fuel cell systems 10A which are configured and operated in parallel in the illustrated embodiment. Fuel enters from a fuel source through the supply conduit 34 which includes a fuel supply manifold 72 and an optional check valve 74. In this example, the check valve 74 is disposed upstream of the first branch point 76 in the supply manifold 72 and prevents or reduces any backflow from the fuel cell systems 10A toward the fuel source. Moreover, a piping flange or blind 78 is depicted at the end of the manifold 72 to provide for cleanout, inspection, expansion of the manifold 72 for the addition of fuel cell systems to the power system 70, and so forth.

On the exhaust side of the fuel cell systems 10A, an exhaust manifold 80 collects the discharge from the exhaust conduits 64 of the individual fuel cell systems 10A. In the illustrated embodiment, the exhaust manifold 80 feeds a common exhaust header 82. As with the fuel supply, the exhaust manifold 80 may employ piping flanges and/or blinds 84 to provide for additional expansion, cleanout accessibility, inspection, and so on. Moreover, if desired, exemplary check valves 86 may be disposed on the one or more of the individual exhaust conduits 64 to prevent or reduce any backflow of exhaust into the fuel cell systems 10.

Figure 7:
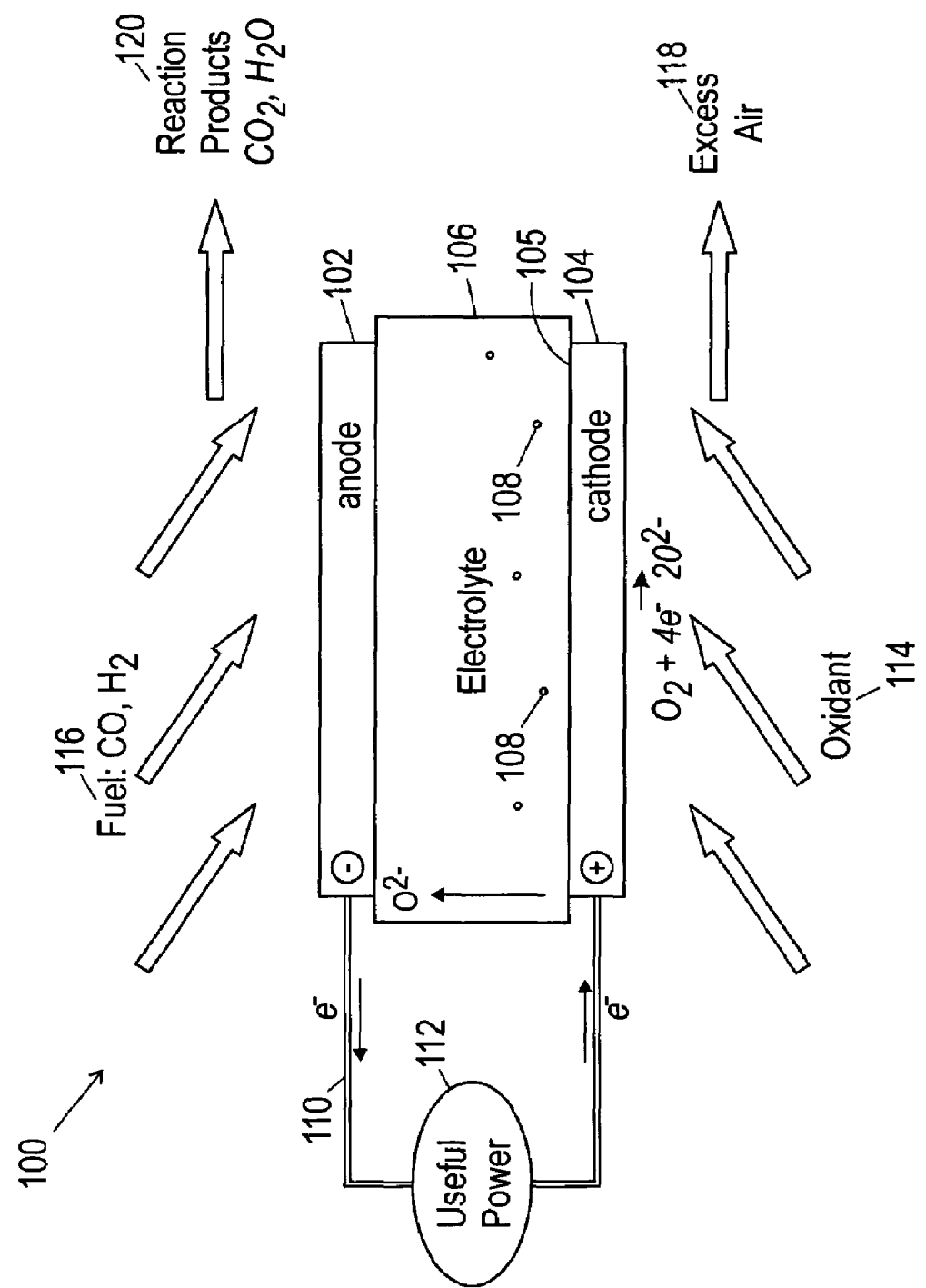
FIG. 7 is a diagrammatical representation of an exemplary fuel cell of FIGS. 1-6 in accordance with embodiments of the present technique.

FIG. 7 depicts a fuel cell 100, such as a solid oxide fuel cell, that may be employed in the fuel cell systems 10 and 10A of the previous figures. In general, the fuel cell 100 may be constructed with two electrodes, an anode 102 and a cathode 104, disposed adjacent an electrolyte 106. In the illustrated embodiment, the anode 102 and cathode 104 sandwich the electrolyte 106. Further, the anode 102 and cathode 104 may be of porous construction to provide additional surface area for the electrochemical reactions to occur.

In operation, an oxidant 114, such as air, flows along the cathode 104 which may also be called the air electrode. When air or oxygen is used as the oxidant, an oxygen molecule contacts the cathode 104 at the interface 105 between the electrolyte 106 and cathode 104. In this example, the oxygen molecule catalytically acquires four electrons from the cathode 104 and splits into two oxygen ions. The oxygen ions 108 diffuse into the electrolyte 106 material and migrate to the other side of the cell 100 where they encounter the anode 102 which may also be called the fuel electrode. The oxygen ions 108 contact the fuel 116 (e.g., hydrogen, carbon monoxide) at the interface 107 of the anode 102 and electrolyte 106, and react catalytically giving off water, carbon dioxide, heat, and electrons. The electrons transport through the anode 102 to the external circuit via cable 110, and back to the cathode 104, providing a source of useful electrical energy 112 in an external circuit. The exhaust of the cell 100 generally includes excess air 118 and reaction products 120, such as carbon dioxide and water.

Figure 8:
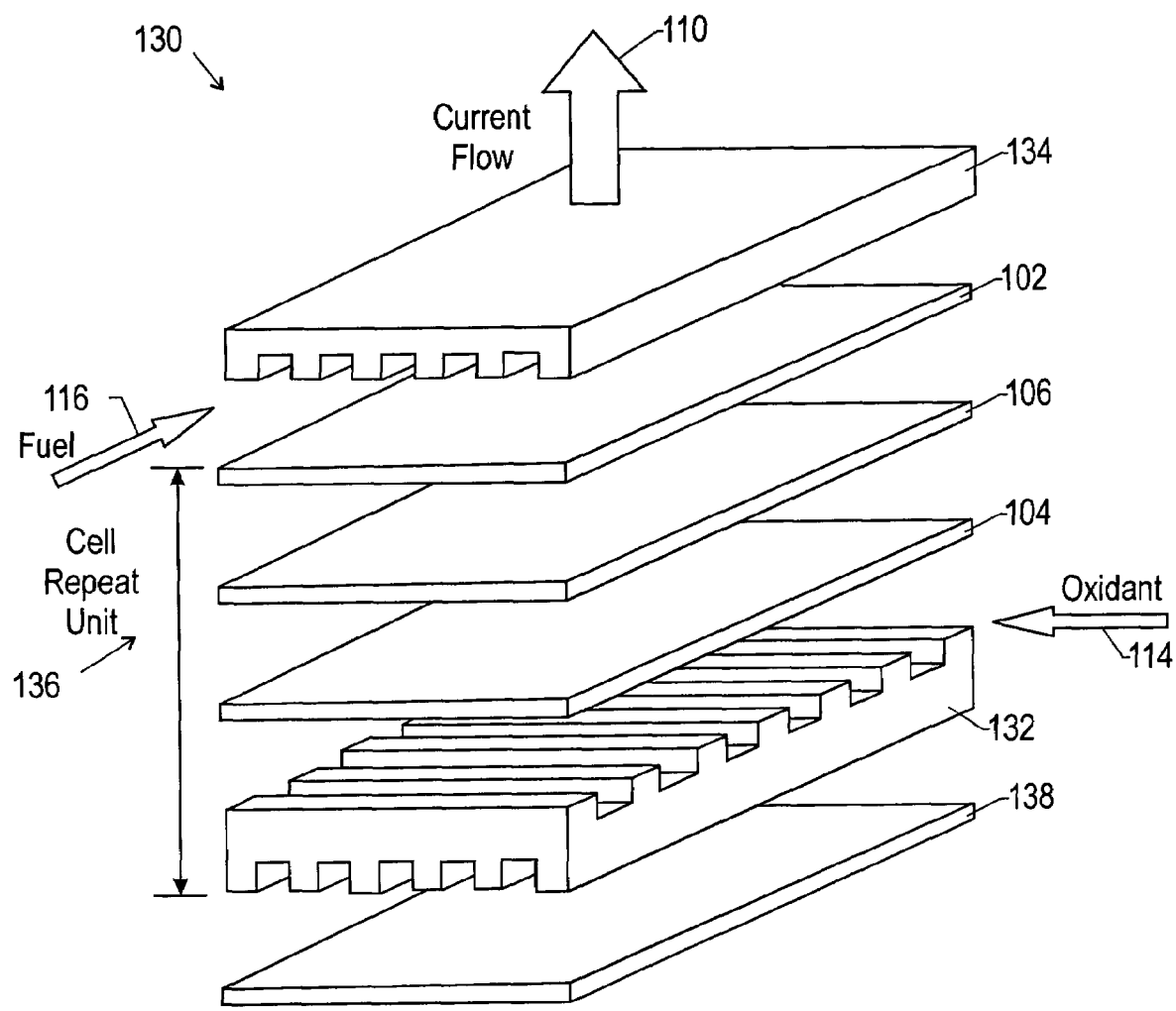
FIG. 8 is an exemplary fuel cell having a planar stack configuration that may be employed in the fuel cell systems of FIGS. 1-6 in accordance with embodiments of the present technique.
Figure 9:
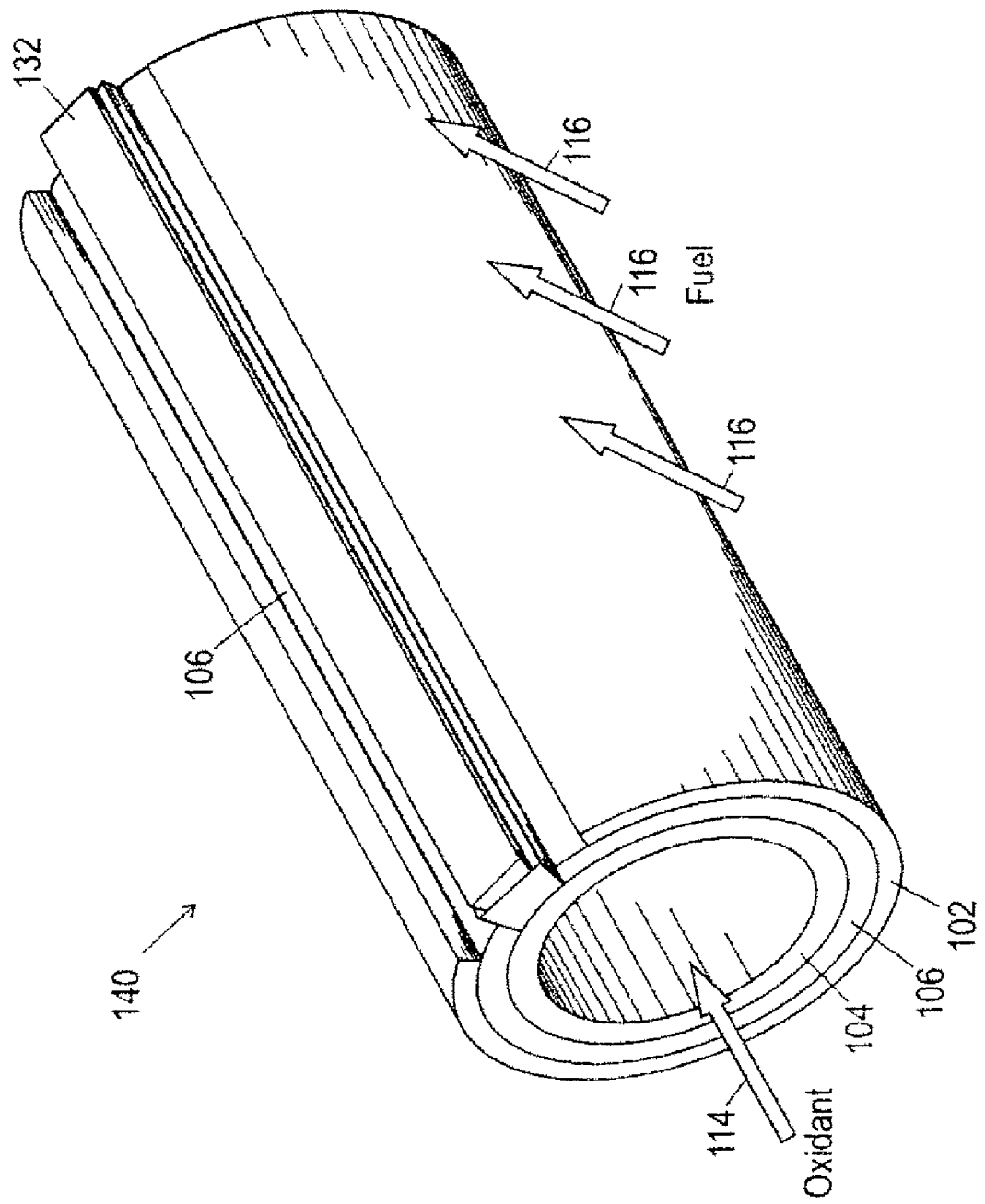
FIG. 9 is an exemplary fuel cell having a tubular configuration that may be employed in the fuel cell systems of FIGS. 1-6 in accordance with embodiments of the present technique.

FIGS. 8 and 9 depict two exemplary design configurations for fuel cells (e.g., solid oxide fuel cells) that may be employed in fuel cell systems 10 and 10A. FIG. 8 depicts a fuel cell 130 having an exemplary planar design. In the planar design in FIG. 8, the components may be assembled in stacks with fuel 116 and oxidant 114 flowing through channels built into the cathode 104 and anode 102. Interconnects 132 and 134 generally connect fuel cell 130 with adjacent individual fuel cells in a fuel cell assembly (e.g., fuel cell assembly 136). As illustrated, the interconnects 132 and 134 may have channels or other configurations to provide volumes or regions for the flow of fuel 114 and oxidant 116. For clarity, the anode 138 of an adjacent fuel cell is depicted in FIG. 8.

FIG. 9 depicts a fuel cell 140 having an exemplary tubular design. In the tubular design depicted in FIG. 9, components may be assembled in the form of a hollow tube, with the cell 140 constructed in layers around a tubular cathode 104, for example. Oxidant 114 may flow through the inside of the tube and fuel 116 may flow around the exterior. An interconnect 132 connects the exemplary fuel cell 140 to an adjacent fuel cell in an assembly 16, for example.

Figure 10:
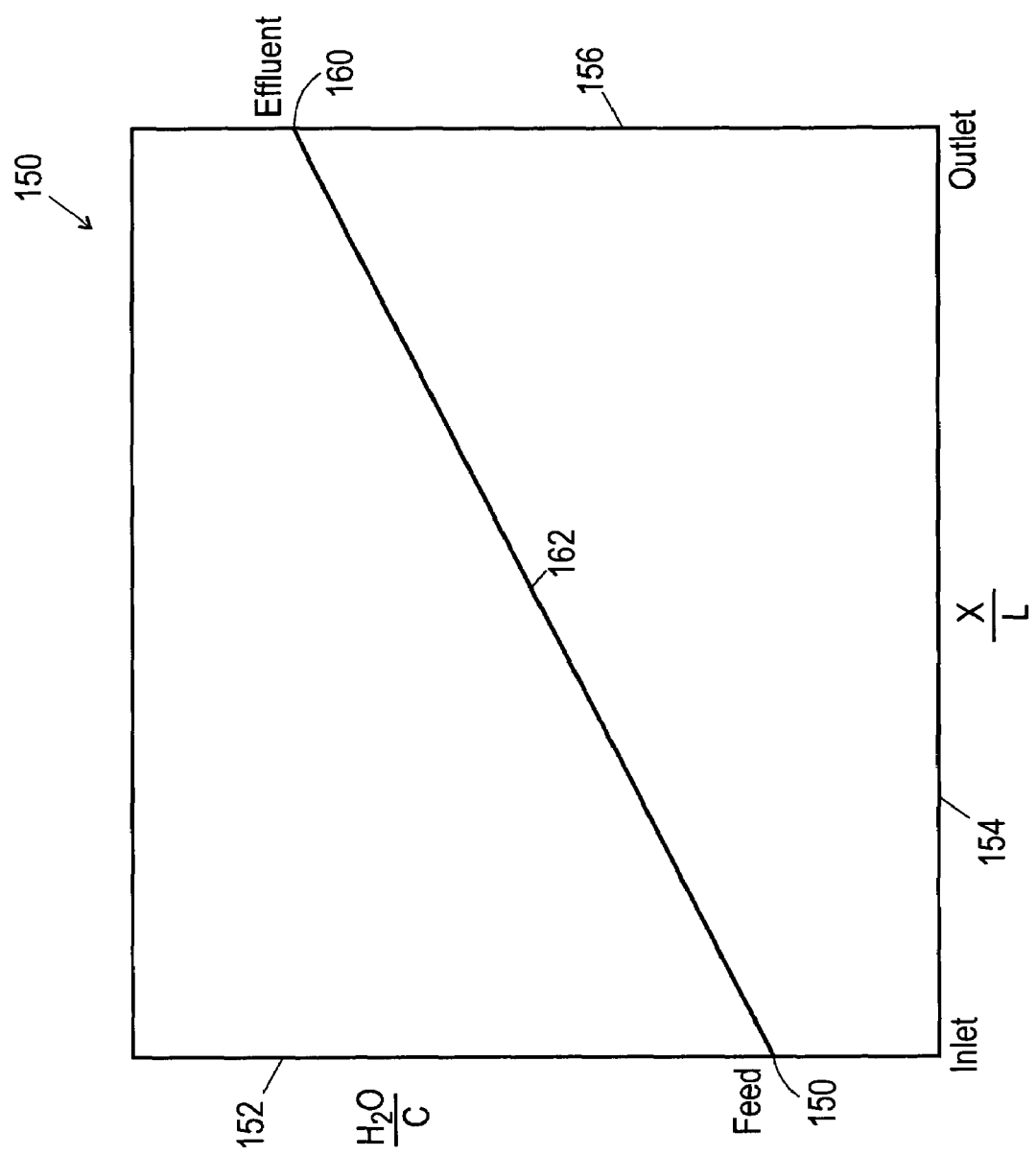
FIG. 10 is a plot depicting an exemplary $H_2O$-concentration gradient through an exemplary fuel cell in accordance with embodiments of the present technique.

FIG. 10 is an exemplary plot 150 illustrating the molar ratio 152 of water (steam) to carbon through a fuel cell within the fuel cell assembly 16 (see FIGS. 1-5), as a function of a location along the internal length, L, of a given fuel cell. Therefore, the plot 150 depicts the molar concentration gradient 162 of water to carbon through the length 154, L, of a typical fuel cell. The two y-axes are the molar ratios 152 and 156 of carbon to water at the inlet and outlet, respectively. The x-axis is the length 154 or distance from the inlet to the outlet of the fuel cell. Again, the position of axis 152 represents the inlet of the fuel cell and the position of axis 156 represents the outlet of the fuel cell.

The molar concentration of water relative to carbon is generally the lowest in the feed to the fuel cell, as depicted by reference numeral 158. Indeed, in a typical operation, the fuel cell is deficient or starved for water at the inlet region of the fuel cell. In contrast, at the outlet (axis 156) of the fuel cell (e.g., in the exhaust or effluent of the fuel cell), the water concentration is generally the highest, as depicted by reference numeral 160. As a result, the carbon deposition and carbon concentration is generally the least at the outlet (axis 156) and the greatest at the inlet (axis 152). Line 162 represents the gradient of increasing concentration of water (e.g., steam) though an exemplary fuel cell. Again, the internal length of the fuel cell is depicted by axis 154. The variable "x" depicted in FIG. 10 denotes the evaluated position along the length, L, of the fuel cell.

FIG. 11 depicts an exemplary method 170 for reversing the flow of fuel through a fuel cell to reduce the amount of carbon deposition within the fuel cell and to promote efficient reforming of the fuel. The method 170 generally increases the operability of the fuel cell and reduces shutdown time for cleaning and/or regeneration of the fuel cell and any associated reformers. Further, the exemplary method 170 generally increases operability by providing for a switch of the fuel-flow direction without substantially interrupting operation of the fuel cell or the production of electricity from the fuel cell.

Initially, in method 170, a switch parameter is generally defined (block 172). The switch parameter may incorporate several factors or variables and determined, for example, by the designer, manufacturer, or user of the fuel cell system, and so on. In one example, the switch parameter is based on a measure of the efficiency of the fuel cell or of the fuel cell assembly 16, or of the voltage output of the fuel cell or fuel cell assembly 16. The switch parameter may be a specified time period (e.g., operating time, calendar time, etc.) based on operating history and/or conditions, and so on. Prior to satisfying the switch parameter, the fuel cell is operated (block 174) with the fuel substantially continuously fed in the same general direction through the fuel cell. The fuel cell continues to operate with the current direction of fuel flow until the parameter is reached or satisfied, as indicated at decision block 176. The switch parameter may be satisfied, for example, upon falling below a specified efficiency rating or voltage output of the fuel cell (or fuel cell assembly 16).

During operation, as discussed, carbon tends to deposit in any inlet (upstream) reformers and at the inlet region of the fuel cell. However, when the switch parameter defined in block 172 is satisfied (decision block 176), then the direction of fuel flow through the fuel cell is altered or reversed, as indicated by block 178. Therefore, the upstream reformer may then become an exit or downstream reformer, and may be regenerated by the high-temperature exhaust having excess steam. Further this excess steam in the current outlet region (which was the inlet region prior to reversing the flow of fuel) may facilitate removal of carbon deposition via hydrothermal decomposition, for example. Lastly, at various times in the execution of exemplary method 170, the switch parameter may be adjusted or redefined, as indicated by decision block 180.

FIG. 12 depicts an exemplary method 190 that is a particular example of method 170 for determining direction of flow of fuel through the fuel cell based on a predetermined period of time. In this example, the switch parameter is a specified time of operating the fuel cell. Initially, the operating time period, t, is determined (block 192) or specified. This predetermined period of time may be based on a variety of factors and variables, and may consider past operating history (e.g., percent operability, carbon deposition cycles, reformer regeneration cycles, etc.) as well as current operating conditions. On the other hand, the specified operating time to switch the fuel flow direction may be merely arbitrary or based on other factors, such as the electricity production demands, expected presence of operating or maintenance personnel, and so forth.

The fuel cell is operated (block 194) until the operating time reaches the specified time period, t, as indicated by decision block 196. Upon reaching the specified operating time, the fuel flow is altered or reversed through the fuel cell, as indicated by block 198. The iterative operating time is then set equal to zero (block 200) and the fuel cell operates in the new flow direction of the fuel until the specified time period is reached again.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a fuel cell, comprising:
    flowing a fuel in a first direction through the fuel cell;
    reacting the fuel with an oxidant within the fuel cell to produce electricity and reaction products comprising steam, wherein a concentration of the steam generally increases in the first direction through the fuel cell; and
    altering the flow of fuel from the first direction to a second direction through the fuel cell upon satisfying a predetermined condition, so as to decrease the amount of carbon deposition within the fuel cell;
    wherein the predetermined condition comprises the fuel cell falling below a specified efficiency rating; and
    wherein altering the direction of fuel flow alters the concentration of steam within the fuel cell to generally increasing in the second direction.

2. The method of claim 1, wherein altering the flow of fuel comprises substantially reversing the direction of the flow of fuel, wherein the first direction is substantially opposite the second direction.

3. The method of claim 1, wherein altering the flow of fuel is performed without substantially interrupting electricity production by the fuel cell.

4. A method of operating a fuel cell, comprising:
    flowing fuel through the fuel cell;
    reacting the fuel with an oxidant within the fuel cell to produce electricity and reaction products comprising steam, wherein a concentration of steam within the fuel cell generally increases in a direction of the fuel flow through the fuel cell; and
    altering the direction of fuel flow through the fuel cell upon satisfying a predetermined condition, so as to decrease the amount of carbon deposition within the fuel cell;
    wherein the predetermined condition comprises the fuel cell, or an assembly of multiple fuel cells, falling below a specified efficiency rating, and without substantially interrupting the production of electricity by the fuel cell, wherein altering the direction of fuel flow alters a concentration gradient of the steam within the fuel cell.

5. The method of claim 4, wherein altering the direction of fuel flow comprises substantially reversing the direction of fuel flow.

6. The method of claim 4, wherein the predetermined condition comprises falling below a voltage output or wattage output of the fuel cell or of an assembly of multiple fuel cells comprising the fuel cell, so as to cause a decrease in the specified efficiency rating.

7. A method of operating a fuel cell, comprising:
feeding hydrocarbon fuel through a first reformer to the fuel cell;
reforming the hydrocarbon fuel in the first reformer;
reacting reformed hydrocarbon fuel with an oxidant in the fuel cell to generate electricity;
discharging an exhaust from the fuel cell through a second reformer; and
regenerating the second reformer with the exhaust, wherein the exhaust comprises steam.

8. The method of claim 7, wherein reforming the hydrocarbon fuel comprises catalytically converting at least a first portion of the hydrocarbon fuel into hydrogen and carbon monoxide.

9. The method of claim 8, comprising reforming a second portion of the hydrocarbon fuel into hydrogen and carbon monoxide internally within the fuel cell.

10. The method of claim 9, wherein the second portion comprises less than 40 weight percent of the hydrocarbon fuel that enters the first reformer.

11. The method of claim 7, wherein the second reformer is regenerated via hydrothermal combustion.

12. The method of claim 7, wherein regenerating the second reformer comprises regenerating catalyst in the second reformer with the exhaust.

13. The method of claim 7, comprising substantially reversing a direction of the hydrocarbon fuel, wherein the hydrocarbon fuel is fed through the second reformer to reform the fuel and the exhaust is discharged through the first reformer to regenerate the first reformer.

14. The method of claim 13, wherein reversing the direction of hydrocarbon fuel is performed upon satisfying a condition.

15. The method of claim 7, wherein the hydrocarbon fuel comprises natural gas.

16. The method of claim 15, wherein the fuel cell comprises a plurality of fuel cells.

17. A system, comprising:
an arrangement of fuel cells;
a first reformer configured to reform feed to a first inlet of the arrangement of fuel cells and, alternatively, to receive an exhaust from a first outlet of the arrangement of fuel cells; and
a second reformer configured to reform hydrocarbon feed to a second inlet of the arrangement of fuel cells and, alternatively, to receive an exhaust from a second outlet of the arrangement of fuel cells.

18. The system of claim 17, wherein the first inlet comprises the second outlet.

19. The system of claim 17, wherein the second inlet comprises the first outlet.

20. The system of claim 17, wherein the arrangement of fuel cells comprises an arrangement of solid oxide fuel cells.

21. A system, comprising:
a fuel cell;
a first reformer operatively coupled to a first inlet of the fuel cell and to a first outlet of the fuel cell; and
a second reformer operatively coupled to a second inlet of the fuel cell and to a second outlet of the fuel cell,
wherein the first and second reformers are configured to catalytically react a carbon-based fuel into at least hydrogen and are configured to be regenerated via an exhaust of the fuel cell.

* * * * *